United States Patent

[11] 3,559,669

[72] Inventor Hansjoerg Dach
Friedrichshafen, Germany
[21] Appl. No. 785,687
[22] Filed Dec. 20, 1968
[45] Patented Feb. 2, 1971
[73] Assignee Zahnradfabrik Friedrichshafen
Aktiengesellschaft
Friedrichshafen, Germany
a corporation of Germany.
[32] Priority Dec. 22, 1967
[33] Germany
[31] 1,655,948

[54] HYDRAULIC CONTROL SYSTEM FOR BRAKES, CLUTCHES AND THE LIKE
7 Claims, 4 Drawing Figs.

[52] U.S. Cl. ................................... 137/102, 74/763
[51] Int. Cl. .................................... F16h 57/10, G05g 9/12
[50] Field of Search ........................... 137/102, (Inquired)

[56] References Cited
UNITED STATES PATENTS

| | | | |
|---|---|---|---|
| 2,688,335 | 9/1954 | Gunderson | 137/102 |
| 3,002,520 | 10/1961 | Morse | 137/102 |
| 3,314,438 | 4/1967 | Ike | 137/102 |
| 3,428,070 | 2/1969 | Valentine | 137/102 |

Primary Examiner—Arthur T. McKeon
Attorney—Karl F. Ross

ABSTRACT: A pair of hydraulic loads in the form of clutches and/or brakes are controlled by a common valve having separate inlet ports for high-pressure fluid and associated outlet ports respectively connected to these loads, each inlet port communicating with its associated outlet port in an initial position of a slider which, in response to pressure buildup in the first outlet port, shifts into an alternate position in which the fluid supply to the first load is reduced and the supply to the second load is substantially cutoff, this shift occurring against a biasing force of a spring bearing upon a piston which is displaceable by hydraulic fluid from the first outlet port, delivered through a constricted passage, to augment the biasing force so as to reestablish the initial position after a further pressure rise at the first load, thereby admitting fluid to both loads at substantially the pressure prevailing at the two inlet ports.

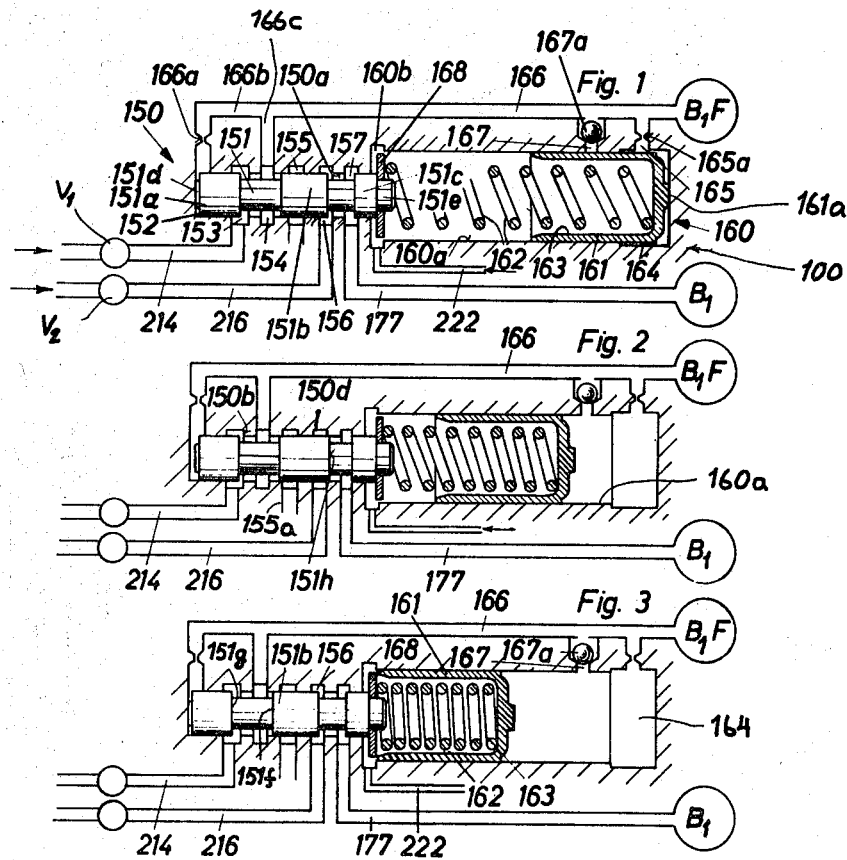
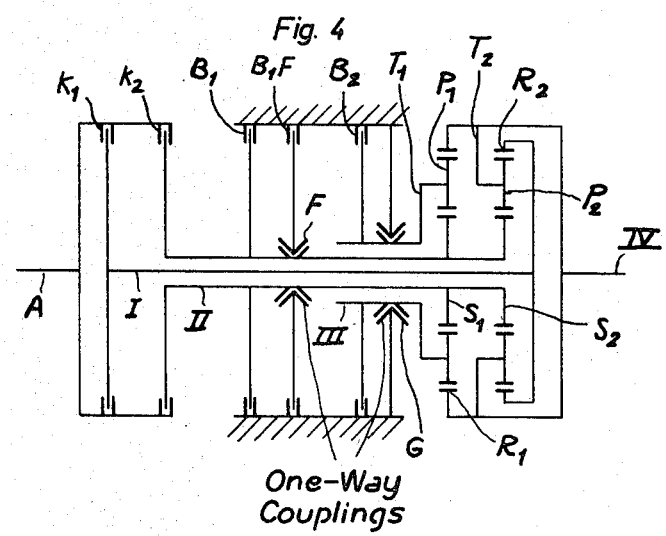
Hansjörg Dach
Inventor.
By Karl F. Ross
Attorney

HYDRAULIC CONTROL SYSTEM FOR BRAKES, CLUTCHES AND THE LIKE

My present invention relates to a fluid-operated load-control system as used, for example, in vehicular transmissions to vary the speed ratio between an input shaft and an output shaft.

In a typical transmission system of this type the two shafts are interconnected by planetary gearing normally having several degrees of freedom. By selectively arresting, or otherwise restricting the mobility of, different movable elements (inner sun gear, planetary-gear carrier, outer sun gear or ring gear) of this system, corresponding speed ratios can be established. This selective engagement of the movable elements is carried out by fluid-actuated—generally hydraulic—clutches and brakes designed to connect some of these elements with an associated shaft or to immobilize such elements with reference to the supporting frame or housing structure. Conventional transmissions of this character usually have three forward speeds (low, intermediate and high) and one reverse speed. The switchover between these various speeds may be controlled automatically, in response to changes in such operating parameters as throttle (accelerator) position and vehicle (wheel) speed, and/or manually.

The clutch and/or brake members serving to establish these various speed ratios, particularly those effective at intermediate speed (commonly referred to as "second gear"), must be capable of performing satisfactorily both during upshifting (from low speed or "first gear"). Depending on whether the engine exerts traction, during normal driving, or drag, as on downhill rides or upon a sudden throttling of the fuel supply, these members are stressed in either one or the other direction of rotation. Since, generally, the stress in the "drag" direction will be less severe than that in the "traction" direction, it has already been proposed (see, for example, German Pat. No. 1,178,307) to split such a member into two independently actuatable parts, specifically a unidirectionally effective first brake and a bidirectionally effective second brake, the latter being needed only for drag so that its power rating may be considerably lower than that of the first brake.

The general object of my present invention is to provide, in a vehicular transmission of this character or any other system wherein two fluid-actuated devices are to be operated under load, means for effecting a gradual transition from the disengaged state to the engaged state thereof. More particularly, it is an object of this invention to provide means for sequentially actuating these devices so that one of them, such as the unidirectionally effective brake mentioned above, becomes fully operative before the other device takes effect.

In commonly owned application Ser. No. 766,679, filed by me jointly with Konrad Sterk and Winfried Felder on 11 Oct. 1968, there has been disclosed and claimed a system in which the delivery of high-pressure fluid to a load, such as a hydraulic clutch or brake, is controlled by a slider which, in response to applied fluid-pressure, shifts from an initial position into a regulating position wherein an inlet port is partly blocked and/or a discharge port is partly unblocked to establish a reduced operating pressure at an outlet port leading to the load, the magnitude of this operating pressure being determined by a countervailing pressure from a biasing spring bearing upon a piston. A restricted connection from the outlet port to the piston cylinder displaces the piston after a certain buildup of fluid pressure so as to increase the biasing force and to restore the slider substantially to its initial position whereby the full inlet pressure becomes effective to actuate the load. The magnitude of the countervailing pressure may be modified by connecting the piston cylinder with a source of variable fluid pressure, e.g. a pressure depending upon the speed of the engine shaft or the wheels of the vehicle.

In accordance with an important feature of my present invention, I provide a system which differs from that of the above-identified application mainly by the provision of a second inlet port and a second outlet port controlled by the slider or equivalent valve means, the two inlet ports being separately connectable to a supply of high-pressure fluid and communicating in the initial or starting position of the slider with the associated first and second outlet ports, respectively, the latter ports in turn leading to the two controlled loads. The shifting of the slider, and the displacement of the biasing piston to restore the slider to its normal or near-normal position, is controlled by the pressure prevailing at the first inlet and outlet ports; on leaving its normal position, the slider cuts off the connection between the second inlet and outlet ports so as to enable actuation of the second load only upon the subsequent restoration of the slider in response to the requisite pressure buildup at the first load. Specifically, this first load may be a unidirectionally effective brake (or clutch) associated with a similar but bidirectionally effective member representing the second load, e.g. for establishing an intermediate speed ratio in a planetary-gear-type transmission of the kind referred to above.

The invention will be described in greater detail with reference to the accompanying drawing in which:

FIG. 1 is a longitudinal sectional view of a valve unit according to my invention for the control of a pair of hydraulic brakes, shown in its starting position;

FIGS. 2 and 3 are views similar to FIG. 1, showing the valve unit in two alternate positions; and FIG. 4 is a diagrammatic representation of a planetary transmission system provided with the brakes of FIGS. 1—3.

The valve unit shown in FIGS. 1—3, resembling that of prior application Ser. No. 766,679, comprises a housing 100 with a fluid-control section 150 and a biasing section 160. Section 150 has a bore 150a accommodating a slider 151 with three heads 151a, 151b, 151c defining two axially spaced peripheral recesses between them. Head 151a, which is the one farthest from section 160, has a boss 151d to maintain a clearance 152 at the left-hand end of bore 150a in the normal position of slider 151 illustrated in FIGS. 1 and 3. This fluid space 152 communicates, via a constriction 166a in a pressure-equalizing passage 166b, with a channel 166 extending from an outlet port 166c to a first load, specifically a unidirectionally effective hydraulic brake $B_{1F}$. Outlet port 166c is in constant communication, by way of two-ring spaces 153 and 154, with a first inlet port 214 connectable to a supply of high-pressure operating fluid with the aid of an auxiliary valve $V_1$; another auxiliary valve $V_2$ serves to connect this fluid supply with a second inlet port 216 terminating at a ring space 156 which, in the normal slider position of FIGS. 1 and 3, communicates with a ring space 157 whence a second outlet port 177 extends to a second load, specifically a bidirectionally effective hydraulic brake $B_1$. A further ring space 155, normally cut off by the head 151b, opens into a discharge port 155a leading to the sump or low-pressure side of the hydraulic system.

Housing section 160 has a bore 160a constituting a cylinder for a piston 161 which initially, i.e. with valves $V_1$ and $V_2$ positioned to vent the inlets 214 and 216, is withdrawn to the right-hand end of its cylinder remote from section 150. A clearance 164 is maintained by a boss 161a on piston 161, this clearance communicating through a constriction 165a in a passage 165 with channel 166 which also has a connection 167, containing a check valve 167a, to the cylinder 160a at a location thereof obstructed by the piston in its retracted position (FIG. 1); it should be noted that the face of piston 161 confronting the space 164 has a larger area than the land 151f of slider head 151b which is subjected to fluid pressure from inlet 214 in the actuating position of valve $V_1$.

A compression spring 162, interposed between the two coaxial elements 151 and 161, is received in the interior 163 of piston 161 and bears upon a disc 168 seated on a boss 151e which projects from the slider head 151c proximal to section 160. The biasing force of spring 162, resisting any rightward displacement of slider 151 from its normal position seen in FIGS. 1 and 3, is augmented by fluid pressure from a further port 222 which opens into a ring space 160b surrounding the disc 168 with clearance as an extension of cylinder 160a. As explained in the prior application identified above, the fluid pressure in port 222 may vary with the speed of the engine or the crankshaft of an automotive vehicle whose transmission includes the unit of FIGS. 1—3; this variable pressure, never exceeding the supply pressure available at inlets 214 and 216, may be provided by a pump (not shown) whose output may decrease with rising crankshaft speed, under the control of a suitable governor, to advance under these conditions the displacement of piston 161 to the left (FIGS. 2 and 3) in response to a sufficient pressure buildup in space 164.

When, in the initial position of FIG. 1, valves $V_1$ and $V_2$ are opened to connect inlets 214 and 216 with the fluid supply, the hydraulic fluid (e.g. oil) quickly fills up the load $B_{1F}$ to develop a reaction force which acts upon the land $151f$ of slider 151 to shift same into the off-normal position of FIG. 2, or slightly therebeyond, so as to restrict by its edge $151g$ the influx of fluid at ring space 153 and, if necessary, to unblock partly the ring space 155 for leaking excess fluid into drain $155a$ until the operating pressure thus established at outlet $166c$ balances the biasing force exerted upon disc 168 by spring 162 and by fluid pressure in cylinder $160a$. This operating pressure is progressively transmitted, via throttle $165a$, to space 164 and eventually moves the piston 161 to the left; upon contacting the disc 168, the piston restores the slider 151 to its normal position (FIG. 3) and, at the same time, cuts off the space 163 from space $160b$ so that slider 151 and piston 161 are now jointly subjected to the differential of the fluid pressures in space 164 and port 222. Concurrently, ring spaces 156 and 157 are interconnected at coacting edges $150d$, $151h$ so that fluid from inlet 216 may again reach the brake $B_1$ whereby the latter becomes fully operative after the brake $B_{1F}$ has taken effect.

If, now, the valve $V_2$ is operated to vent the inlet 216, brake $B_1$ is deactivated but brake $B_{1F}$ remains engaged, the system maintaining the position illustrated in FIG. 3. A subsequent venting of inlet 214 by valve $V_1$, on the other hand, quickly relieves the pressure in space 164 through check valve $167a$ and allows the piston 161 to regain the position of FIG. 1, the system thus returning to normal.

The two brakes $B_{1F}$ and $B_1$ may form part of an otherwise conventional planetary-gear transmission system as shown diagrammatically in FIG. 4. The system comprises a drive shaft A, several intermediate shafts I, II, III disposed in nested coaxial relationship, and a driven shaft IV. Two clutches $K_1$, $K_2$ and three brakes $B_1$, $B_{1F}$, $B_2$ are schematically shown as including discs cooperating with hydraulically operable clamp jaws. Clutches $K_1$ and $K_2$ are actuatable to connect input shaft A with intermediate shaft I or II, respectively; brakes $B_{1F}$ and $B_1$ serve to arrest the intermediate shaft II, whereas brake $B_2$ fulfills the same function with reference to shaft III. Brake $B_{1F}$ is rendered unidirectionally effective by the interposition of a one-way coupling F, such as an overrunning clutch, between its disc and the shaft II. A similar one-way coupling G prevents reverse rotation of shaft III independently of brake $B_2$.

Two planetary-gear assemblies include respective sun gears $S_1$, $S_2$ keyed to shaft II, a first ring gear $R_1$ keyed to output shaft IV, a second ring gear $R_2$ keyed to shaft I, and a pair of carrier discs $T_1$, $T_2$ supporting planetary gears $P_1$, $P_2$ respectively in mesh with gears $S_1$, $R_1$ and $S_2$, $R_2$. Planet carrier $T_1$ is rigid with shaft III whereas planet carrier $T_2$ is unitary with ring gear $R_1$.

The following table summarizes the engaged (+) and disengaged (−) positions of clutches $K_1$, $K_2$, brakes $B_{1F}$, $B_1$, $B_2$, and one-way couplings F, G in the three forward-speed positions "low," "intermediate" and "high" as well as in reverse; the parenthetical symbol (+) indicates that the engagement or disengagement of the device concerned, specifically the brake $B_2$ at low speed, is immaterial:

| | $K_1$ | $K_2$ | $B_1F$ | $B_1$ | $B_2$ | F | G |
|---|---|---|---|---|---|---|---|
| Low | + | − | − | − | (+) | − | + |
| Intermediate | + | − | + | + | − | + | + |
| High | + | + | + | + | − | + | − |
| Reverse | − | + | − | − | + | − | − |

It will thus be seen that the two brake members $B_{1F}$, $B_1$ can be operated independently and that, for example, brake $B_{1F}$ can remain engaged in third gear so that, upon a subsequent downshifting to second gear, only brake $B_1$ need be actuated, the valve unit according to the invention thus being continuously in the position of FIG. 3. Conversely, upon an upshifting from first gear the brake $B_{1F}$ will take effect first, brake $B_1$ engaging only afterwards since its action to immobilize shaft II will be needed only when output shaft IV tends to outrun input shaft A.

Naturally, the transmission of FIG. 4 is only representative of a variety of other systems with two planet carriers and three intermediate shafts, and the principles of my invention are more generally applicable to any two hydraulically or pneumatically operated loads to be actuated in sequence as described above.

I claim:

1. In a fluid-operated load-control system, in combination:
   a first and a second fluid-actuatable load;
   valve means comprising a housing with a first and a second inlet port separately connectable to a supply of high-pressure operating fluid, a first outlet port connected to said first load, and a second outlet port connected to said second load, said valve means having a normal position connecting said first inlet port with said first outlet port and said second inlet port with said second outlet port, said valve means being provided with a land facing said first inlet port for displacement by the supply pressure thereof into an off-normal position wherein said valve means restricts the flow of fluid to said first outlet port and substantially cuts off said second outlet port from said second inlet port, with establishment of a gradually rising operating pressure lower than said supply pressure at said first outlet port;
   biasing means opposing such displacement of said valve means by said supply pressure; and
   throttled conduit means extending from said first outlet port to said biasing means for exerting thereon a force-increasing action in response to a predetermined rise in said operating pressure, thereby restoring said valve means to said normal position and reestablishing communication between said second inlet and outlet ports.

2. The combination defined in claim 1 wherein said biasing means comprises a piston with a face larger than said land and a compression spring interposed between said valve means and said piston, said housing forming a cylinder for said piston with a fluid space remote from said spring adjacent said face, said conduit means opening into said fluid space.

3. The combination defined in claim 2 wherein said cylinder is provided with an additional port communicating with a source of variable fluid pressure less than said supply pressure bearing upon said piston to modify the magnitude of said predetermined rise in said operating pressure, said piston separating said additional port from said conduit means.

4. The combination defined in claim 2 wherein said valve means comprises a slider coaxial with said piston, said slider and said piston being provided with cooperating formations interengageable in a position of maximum compression of said spring for positively restoring said slider to its normal position.

5. The combination defined in claim 4 wherein said slider is provided with three spaced-apart heads defining a first recess cooperating with said first inlet and outlet ports and a second recess cooperating with said second inlet and outlet ports, said housing further having a discharge port normally obstructed by one of said heads and positioned to be at least partly unblocked thereby for communication with said first recess in said off-normal position to control the magnitude of said operating pressure.

6. The combination defined in claim 5 wherein said housing forms a bore for said slider with a restricted pressure-equalizing connection from said first outlet to a location confronting the head farthest from said position.

7. The combination defined in claim 2 wherein said cylinder is provided with unidirectionally effective venting means extending to said first outlet port from a location obstructed by said position in a retracted position thereof.